United States Patent
Sakuma et al.

(10) Patent No.: US 10,586,453 B2
(45) Date of Patent: Mar. 10, 2020

(54) INFORMATION PROVIDING SYSTEM AND VEHICLE

(71) Applicant: TOYOTA JIDOSHA KABUSHIKI KAISHA, Toyota-shi, Aichi-ken (JP)

(72) Inventors: Satoru Sakuma, Nagakute (JP); Shuhei Yamamoto, Aichi-ken (JP); Munehiro Kamiya, Anjo (JP); Hideo Hasegawa, Nagoya (JP); Shinji Kurachi, Nagoya (JP); Tomoya Shimizu, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/164,029

(22) Filed: Oct. 18, 2018

(65) Prior Publication Data

US 2019/0122553 A1 Apr. 25, 2019

(30) Foreign Application Priority Data

Oct. 23, 2017 (JP) ................................ 2017-204608

(51) Int. Cl.
*G08G 1/14* (2006.01)
*G06K 9/00* (2006.01)
*G07C 5/00* (2006.01)

(52) U.S. Cl.
CPC ......... *G08G 1/143* (2013.01); *G06K 9/00812* (2013.01); *G07C 5/008* (2013.01)

(58) Field of Classification Search
CPC .......... G08G 1/14; G08G 1/141; G08G 1/143; G08G 1/144; G08G 1/145; G08G 1/146; G08G 1/147; G08G 1/148; G07C 5/008; G06K 9/00812; B60R 2300/806; B60Q 1/484
USPC ...................................................... 340/932.2
See application file for complete search history.

(56) References Cited

U.S. PATENT DOCUMENTS

2015/0371541 A1* 12/2015 Korman ................. G08G 1/147
340/932.2
2018/0232583 A1* 8/2018 Wang .................. G06K 9/00812

FOREIGN PATENT DOCUMENTS

JP 2010-277420 A 12/2010

* cited by examiner

*Primary Examiner* — Brian Wilson
(74) *Attorney, Agent, or Firm* — Hunton Andrews Kurth LLP (57) ABSTRACT

A controller of a first vehicle specifies a position of an unoccupied parking space, from a detected position of the first vehicle and an image shot with a camera. A server-side controller transmits target parking space information indicating a position of a parking space within a predetermined range from a position of a second vehicle which has transmitted a request, of the positions of the parking spaces indicated by vacant parking space information from the first vehicle, to the second vehicle. A controller of the second vehicle obtains the target parking space information from the server. An informer of the second vehicle informs the position of the parking space indicated by the obtained target parking space information.

5 Claims, 7 Drawing Sheets

| RECEPTION TIME | LOCATION OF PARKING LOT | PARKING SPACE | | PARKING SPACE DESCRIPTION INFORMATION |
|---|---|---|---|---|
| | | EAST LONGITUDE | NORTH LATITUDE | |
| a : b | A PREFECTURE, B CITY, C TOWN, m, n | t | u | — |
| c : d | D PREFECTURE, E CITY, F TOWN, p, q | — | — | NO. g |
| e : f | G PREFECTURE, H CITY, J TOWN, r, s | v | w | EAST LONGITUDE x, NORTH LATITUDE y |
| ⋮ | ⋮ | ⋮ | ⋮ | ⋮ |

INFORMATION PROVIDING SYSTEM AND VEHICLE

This nonprovisional application is based on Japanese Patent Application No. 2017-204608 filed on Oct. 23, 2017 with the Japan Patent Office, the entire contents of which are hereby incorporated by reference.

BACKGROUND

Field

The present disclosure relates to an information providing system and a vehicle, and in particular to an information providing system and a vehicle suitable for informing a position of an unoccupied vehicle parking space.

Description of the Background Art

Conventionally, in a parking lot where a lock plate is provided for each parking space, such as a coin parking lot, it is possible to grasp an unoccupied parking space. However, in a parking lot where merely white lines are drawn on the ground thereof, a system of some kind for sensing a vehicle is required to grasp an unoccupied parking space.

Japanese Patent Laying-Open No. 2010-277420 discloses a system which uses a monitoring camera provided to a predetermined parking lot for shooting an image of the parking lot, and a vehicle sensing device for sensing the presence or absence of a vehicle in a parking spot provided in the parking lot, to recognize the vacancy of the parking spot.

SUMMARY

In the system of Japanese Patent Laying-Open No. 2010-277420, it is not possible to sense an unoccupied parking space without using the monitoring camera and the vehicle sensing device.

The present disclosure has been made to solve such a problem, and an object thereof is to provide an information providing system and a vehicle capable of informing a driver of the vehicle of an unoccupied parking space without providing a special device to a parking lot.

An information providing system in accordance with the present disclosure includes a plurality of vehicles including a first vehicle and a second vehicle, and a server configured to communicate with each of the plurality of vehicles. Each of the plurality of vehicles includes a camera configured to shoot an image around the vehicle, a position detector configured to detect a position of the vehicle, an informer configured to inform a user of information, and a vehicle-side controller. The server includes a server-side controller.

The vehicle-side controller of the first vehicle is configured to specify a position of an unoccupied parking space, from a position of the first vehicle detected by the position detector of the first vehicle and the image shot with the camera, and transmit vacant parking space information indicating the specified position to the server. The vehicle-side controller of the second vehicle is configured to transmit to the server, a position of the second vehicle detected by the position detector of the second vehicle, and a request to obtain information indicating a position of an unoccupied parking space of parking spaces within a predetermined range from the position of the second vehicle.

The server-side controller is configured to transmit target parking space information indicating a position of a parking space within the predetermined range from the position of the second vehicle which has transmitted the request, of the positions of the parking spaces indicated by the vacant parking space information transmitted from the first vehicle, to the second vehicle. The vehicle-side controller of the second vehicle is configured to obtain the target parking space information transmitted from the server. The informer of the second vehicle is configured to inform the position of the parking space indicated by the target parking space information obtained by the vehicle-side controller of the second vehicle.

With such a configuration, the second vehicle informs the position of the parking space within the predetermined range from the position of the second vehicle, of the unoccupied parking spaces indicated by the vacant parking space information from the plurality of vehicles. As a result, it is possible to provide an information providing system capable of informing a driver of the vehicle of an unoccupied parking space without providing a special device to a parking lot.

Preferably, the vehicle-side controller of the first vehicle is configured to specify, when the first vehicle exits a parking space, a position of the parking space as the position of the unoccupied parking space. With such a configuration, the position of the unoccupied parking space can be transmitted to the server, other than based on the image shot with the camera.

Preferably, the vehicle-side controller of the first vehicle is configured to specify, when another vehicle exits a parking space, a position of the parking space as the position of the unoccupied parking space, based on the image shot with the camera. With such a configuration, not only the position of a parking space which has been unoccupied before the shooting with the camera, but also the position of a parking space which becomes unoccupied during the shooting with the camera can be transmitted to the server.

Preferably, the information providing system includes a parking lot including a plurality of parking spaces configured to display identification information which can specify a position of each parking space. The vehicle-side controller of each of the plurality of vehicles is configured to specify the position of each parking space included in the parking lot, from the identification information included in the image shot with the camera. With such a configuration, the vehicle can specify the position of each parking space included in the parking lot from the identification information.

Preferably, the vehicle-side controller of the first vehicle is configured to specify the position of the unoccupied parking space, not only when the first vehicle is parked at a parking space but also when the first vehicle is traveling. Such a configuration can increase opportunities to specify the position of an unoccupied parking space, and thus can specify more unoccupied parking spaces.

A vehicle in accordance with another aspect of the present disclosure is configured to communicate with a server. The vehicle includes a camera configured to shoot an image around the vehicle, a position detector configured to detect a position of the vehicle, an informer configured to inform a user of information, and a controller. The controller is configured to specify a position of an unoccupied parking space, from the position of the vehicle detected by the position detector and the image shot with the camera, and transmit vacant parking space information indicating the specified position to the server, to provide the vacant parking space information to another vehicle. Further, the controller is configured to transmit to the server, the position of the vehicle detected by the position detector, and a request to obtain information indicating a position of an unoccupied parking space of parking spaces within a predetermined range from the position of the vehicle, and obtain from the server, target parking space information indicating a position of a parking space within the predetermined range from the position of the vehicle detected by the position detector. The informer is configured to inform the position of the parking space indicated by the target parking space information obtained by the controller.

With such a configuration, it is possible to provide a vehicle capable of informing a driver of the vehicle of an unoccupied parking space without providing a special device to a parking lot.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment of the present disclosure will be described in detail with reference to the drawings. It should be noted that identical or corresponding parts in the drawings will be designated by the same reference numerals, and the description thereof will not be repeated.

Figure 1:
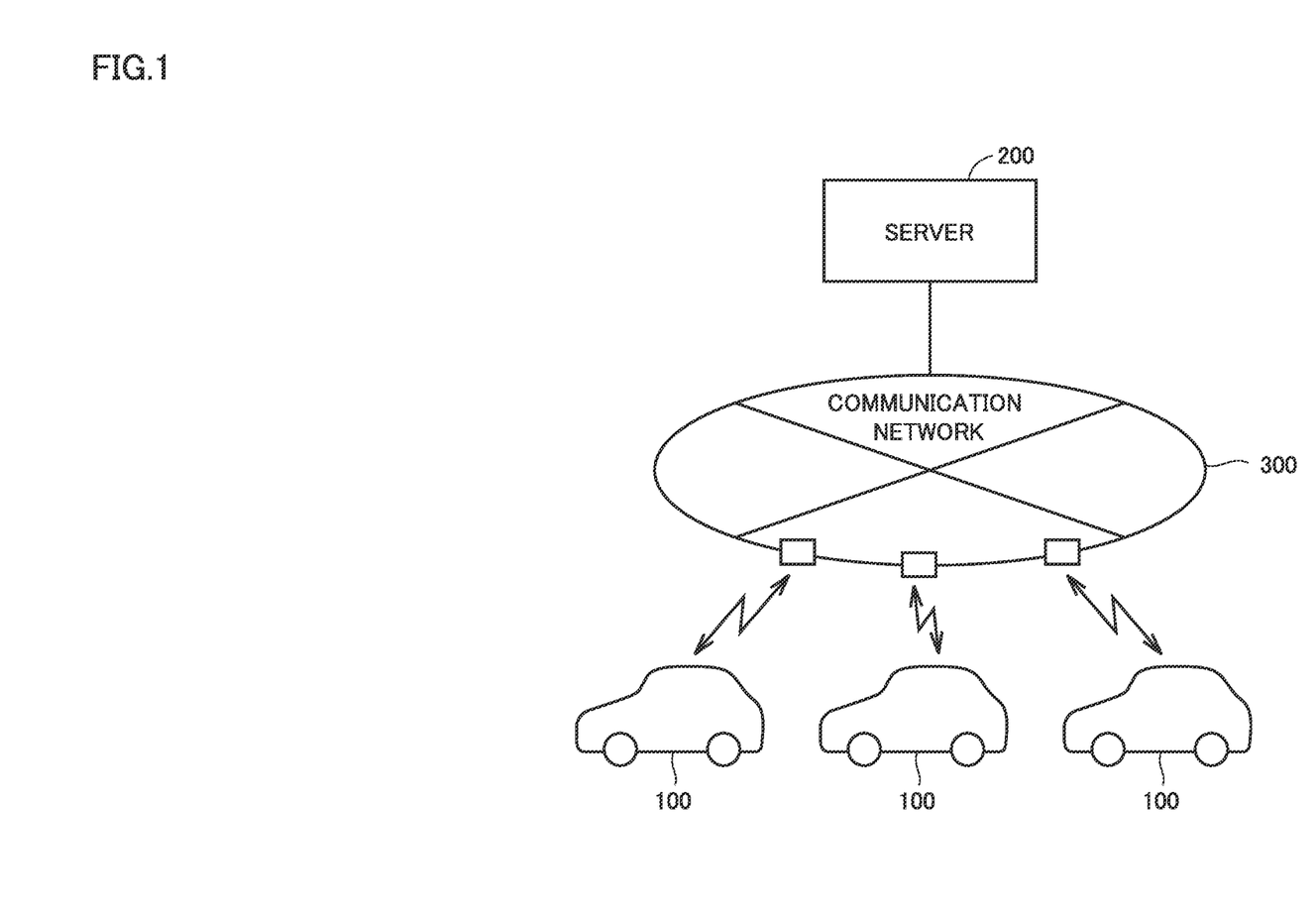
FIG. 1 is a view schematically showing an entire configuration of a parking space information providing system in accordance with the present embodiment.

FIG. 1 is a schematic view of an entire configuration of a parking space information providing system 10 according to the present embodiment. Referring to FIG. 1, parking space information providing system 10 includes a plurality of vehicles 100 and a server 200. Vehicles 100 and server 200 are configured to communicate with each other via a communication network 300 such as the Internet or a telephone line. Each vehicle 100 is configured to transmit and receive information to and from communication network 300 by wireless communication. It should be noted that vehicles 100 and server 200 may be configured to directly communicate with each other.

As described below, parking space information providing system 10 provides information on vacant parking spaces to a requesting vehicle 100, based on information from each vehicle 100. Since it is desirable for vehicle 100 in the present embodiment to monitor parking spaces therearound with a vehicle-mounted camera 170 even while it is parked, it consumes electric power even while it is parked. Accordingly, vehicle 100 in the present embodiment is preferably a vehicle equipped with a large-capacity power storage device. For example, if vehicle 100 is an electric vehicle, such a vehicle is equipped with a power storage device having a larger capacity when compared with a case where vehicle 100 is not an electric vehicle. Therefore, even when vehicle 100 always monitors the surroundings with vehicle-mounted camera 170 even while it is parked, such monitoring does not have a considerable impact on the SOC (State of Charge) of the power storage device, when compared with a case where vehicle 100 is not equipped with a large-capacity power storage device.

Figure 2:
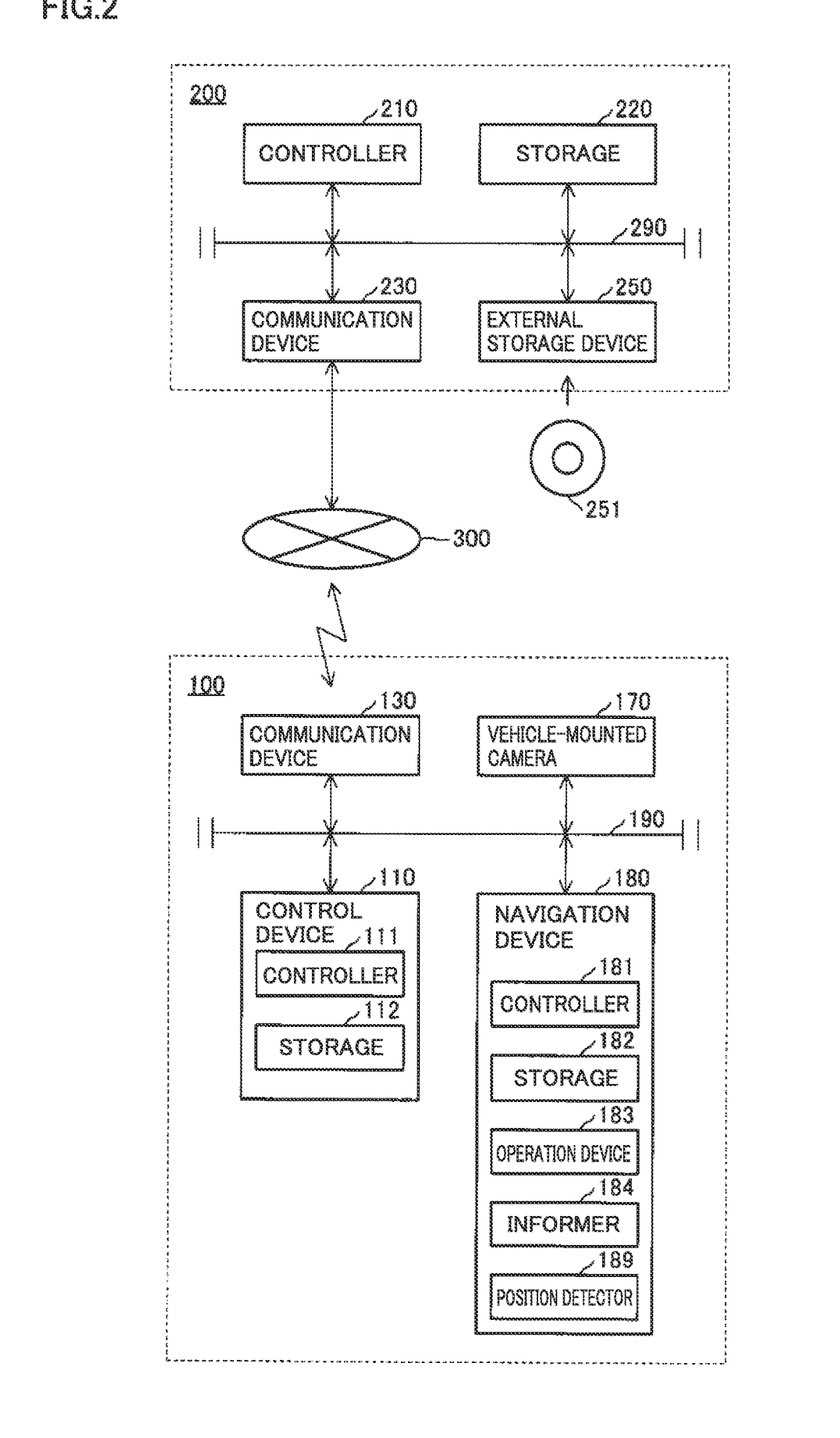
FIG. 2 is a block diagram for illustrating a configuration of a vehicle and a server.

FIG. 2 is a block diagram for illustrating a configuration of each vehicle and the server. Referring to FIG. 2, vehicle 100 includes a control device 110, a communication device 130, vehicle-mounted camera 170, and a navigation device 180. Control device 110, communication device 130, vehicle-mounted camera 170, and navigation device 180 are connected with each other through a wired, vehicle-mounted network 190 such as a CAN (Controller Area Network).

Communicator 130 transmits and receives data to and from an external device (for example, server 200) via communication network 300, using a predetermined protocol. Communicator 130 transmits data received from a device connected to vehicle-mounted network 190, such as control device 110, to the outside, or passes data received from the outside to a device connected to vehicle-mounted network 190, such as control device 110.

Vehicle-mounted camera 170 is a CCD (Charge Coupled Device) camera, for example, and is attached to at least one of the front, rear, right, and left of vehicle 100. Vehicle-mounted camera 170 shoots an image around vehicle 100. Data shot with vehicle-mounted camera 170 is transmitted to control device 110.

Navigation device 180 includes a controller 181 for controlling entire navigation device 180, a storage 182 for storing predetermined information, an operation device 183 for operating navigation device 180, an informer 184 for informing predetermined information of navigation device 180 through display and voice, and a position detector 189 for detecting a position.

Storage 182 includes a RAM (Random Access Memory) used as a workspace necessary to execute a program by controller 181, and a ROM (Read Only Memory) for storing the program to be executed by controller 181. In addition, in the RAM, programs and data for executing predetermined processing are read from the ROM or the like and are stored. Further, a recording medium such as a memory card may be used as an auxiliary storage device for assisting a storage area of the RAM.

Operation device 183 includes a plurality of operation buttons for causing navigation device 180 to perform a predetermined function, and a touch panel formed on a display of informer 184. An operation signal indicating operation contents input into navigation device 180 by operating the operation buttons and the touch panel of operation device 183 is passed to controller 181.

Informer 184 includes a liquid crystal display (hereinafter referred to as an "LCD") having the display, on which the touch panel is formed, and a speaker. The LCD of informer 184 displays an image received from controller 181 indicating information for navigating vehicle 100 and the operation buttons of the touch panel, and the like. It should be noted that informer 184 may include another FPD (Flat Panel Display) such as an EL (electro-luminescence) display, instead of an LCD. The speaker of informer 184 outputs a voice signal received from controller 181 as voice.

Position detector 189 detects the position of the vehicle based on an electric wave from a GPS (global positioning system) satellite, and passes the detected position information to controller 181.

Controller 181 includes an MPU (micro processing unit) and an auxiliary circuit thereof. Controller 181 controls storage 182, operation device 183, informer 184, and position detector 189, performs predetermined processing according to the programs and data stored in storage 182, processes data input from operation device 183 or other devices connected to vehicle-mounted network 190 (for example, vehicle-mounted camera 170, control device 110, communication device 130, and the like), and causes the processed data to be stored in storage 182, to be informed by informer 184, or to be output to the other devices.

Specifically, controller 181 performs a variety of navigation processing for vehicle 100 using the position information (GPS information) of vehicle 100 detected by position detector 189. More specifically, controller 181 controls informer 184 to calculate a traveling route (a scheduled traveling route or a target route) for vehicle 100 from the present location to a destination based on the GPS information of vehicle 100 and road map data stored in storage 182, display information on the target route, and output the information as voice.

Control device 110 is a so-called ECU (Electronic Control Unit), and includes a controller 111 for controlling entire vehicle 100, and a storage 112 for storing predetermined information. Storage 112 is the same as storage 182 of navigation device 180 described above, and thus an overlapped description thereof will not be repeated.

Controller 111 includes an MPU (micro processing unit) and an auxiliary circuit thereof. Controller 111 performs predetermined processing according to programs and data stored in storage 112, processes data input from other devices connected to vehicle-mounted network 190 (for example, communication device 130, vehicle-mounted camera 170, navigation device 180, and the like), and causes the processed data to be stored in storage 112, or to be output to the other devices.

Specifically, controller 111 controls devices such as a drive device for a motor generator in response to signals from sensors and the like of vehicle 100, such that vehicle 100 enters a desired state.

Server 200 includes a controller 210, a storage 220, a communication device 230, and an external storage device 250. Storage 220 and communication device 230 are the same as storage 112 of control device 110 and communication device 130 of vehicle 100 described above, and thus an overlapped description thereof will not be repeated.

External storage device 250 includes a storage device such as a hard disk drive, a flexible disk drive, an MO (Magneto-Optical disk) drive, a CD (Compact Disc) drive, a DVD (Digital Versatile Disk) drive, or a memory card reader writer. External storage device 250 magnetically, optically, or electrically records predetermined data or program received from controller 210 in a recording medium 251, or reads the data or program from recording medium 251 and passes it to controller 210. Examples of recording medium 251 include magnetic disks such as a hard disk and a flexible disk, optical disks such as a CD-ROM (Compact Disk Read Only Memory), a CD-R (Compact Disk Recordable), a CD-RW (Compact Disk ReWritable), a DVD-ROM (Digital Versatile Disk Read Only Memory), a DVD-R (Digital Versatile Disk Recordable), a DVD-RW (Digital Versatile Disk ReWritable), a DVD-RAM (Digital Versatile Disk Random Access Memory), a DVD+R, and a DVD+RW, magneto-optical disks such as an MO (Magneto-Optical disk), a memory card, and a USB (Universal Serial Bus) memory.

Controller 210 includes an MPU (micro processing unit) and an auxiliary circuit thereof. Controller 210 controls storage 220, communication device 230, and external storage device 250, performs predetermined processing according to programs and data stored in storage 220, processes data input from communication device 230 and external storage device 250, and causes the processed data to be stored in storage 220, to be output from communication device 230 to other devices, or to be stored in recording medium 251 of external storage device 250.

It should be noted that, although server 200 does not include an operation device and a display device in the present embodiment, the present disclosure is not limited thereto, and server 200 may include components of an operation device and a display device. The operation device includes a keyboard and a mouse, and an operation signal indicating operation contents input into server 200 by operating the keyboard and the mouse of the operation device is passed to controller 210. The display device includes an LCD, and the LCD displays an image corresponding to image data received from controller 210.

For the purpose of grasping a vacant parking space in a parking lot, with a conventional system, it is not possible to sense an unoccupied parking space without using a monitoring camera provided to the parking lot, a device sensing the presence or absence of a vehicle in a parking space, and the like.

Accordingly, in the present embodiment, a first vehicle 100A specifies a position of an unoccupied parking space, from a position of the first vehicle detected by position detector 189 and the image shot with vehicle-mounted camera 170, and transmits vacant parking space information indicating the specified position to server 200. A second vehicle 100C transmits a position of second vehicle 100C detected by position detector 189, and a request to obtain information indicating a position of an unoccupied parking space of parking spaces within a predetermined range from the position of second vehicle 100C, to server 200.

Server 200 transmits target parking space information indicating a position of a parking space within the predetermined range from the position of second vehicle 100C which has transmitted the request, of the positions of the parking spaces indicated by the vacant parking space information transmitted from the plurality of vehicles 100, to second vehicle 100C. Second vehicle 100C obtains the target parking space information transmitted from server 200, and informer 184 thereof informs the position of the parking space indicated by the obtained target parking space information.

Thereby, second vehicle 100C informs the position of the parking space within the predetermined range from the position of second vehicle 100C, of the unoccupied parking spaces indicated by the vacant parking space information from the plurality of vehicles 100. As a result, it is possible to inform a driver of second vehicle 100C of the unoccupied parking space without providing a special device to a parking lot.

Figure 3:
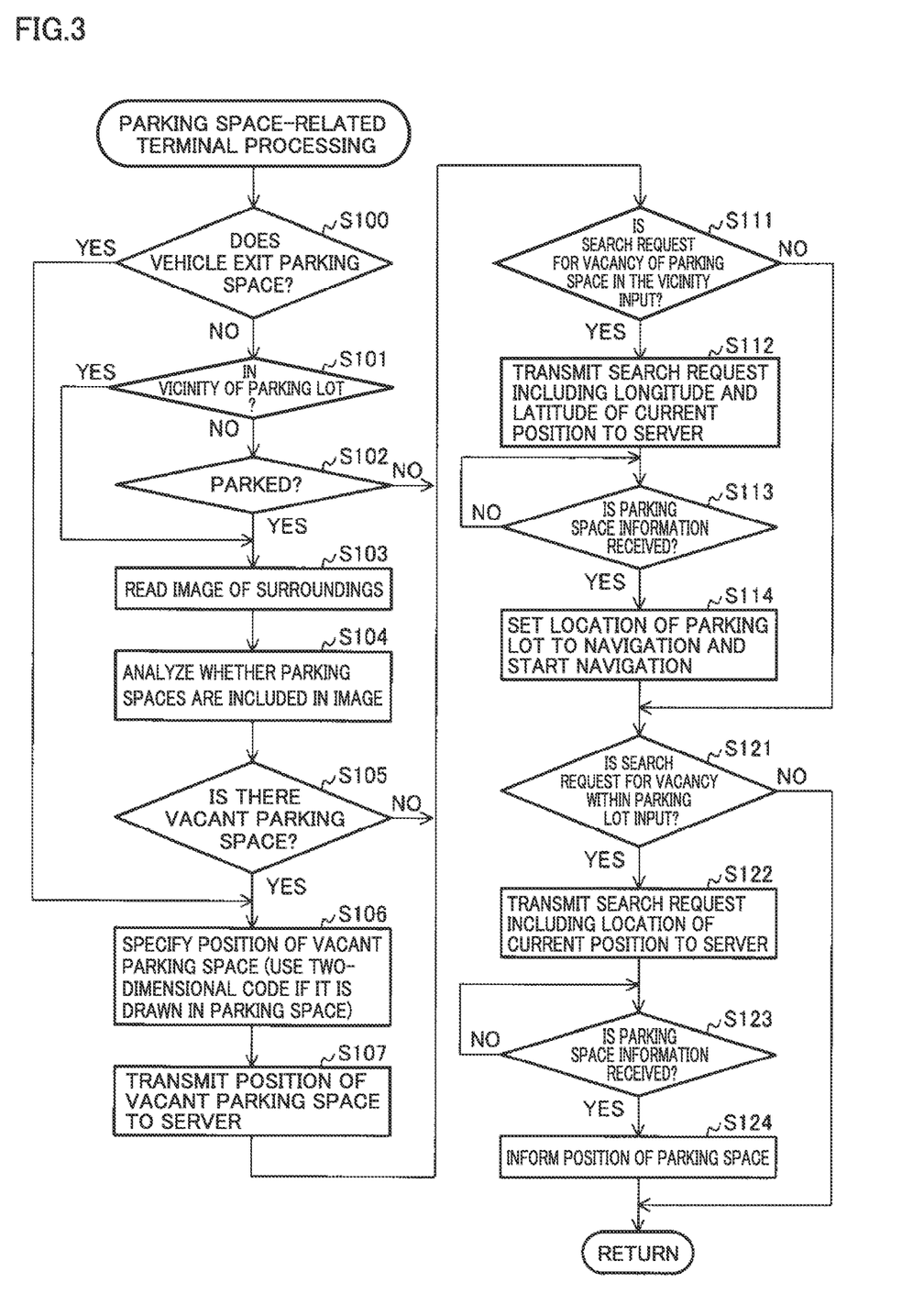
FIG. 3 is a flowchart showing a flow of parking space-related terminal processing performed by the vehicle in the present embodiment.

FIG. 3 is a flowchart showing a flow of parking space-related terminal processing performed by vehicle 100 in the present embodiment. Referring to FIG. 3, controller 181 of navigation device 180 of vehicle 100 obtains a current parking position of vehicle 100 from position detector 189, and determines whether or not it is considered that the position is within an area of a parking lot shown in a map stored in storage 182 (including not only the one described as a parking lot in the map, but also the one described as a store having a parking lot), and the vehicle is at the moment when it exits a parking space by starting moving from a parked state (S100). When controller 181 determines that the vehicle is at the moment when it exits the parking space (YES in S100), controller 181 proceeds the processing to be performed to S106.

On the other hand, when controller 181 determines that the vehicle is not at the moment when it exits the parking space (NO in S100), controller 181 obtains a current traveling position of vehicle 100 from position detector 189, and determines whether or not the position is in the vicinity of the parking lot shown in the map stored in storage 182 (including not only the one described as a parking lot in the map, but also the one described as a store having a parking lot) (S101). The vicinity refers to a predefined range (for example, a range of several tens of meters from the parking lot) in which parking spaces of the parking lot may be included in an image shot with vehicle-mounted camera 170 of vehicle 100.

When controller 181 determines that the vehicle is not traveling in the vicinity of the parking lot (NO in S101), controller 181 determines whether or not the vehicle is parked (S102). When controller 181 determines that the vehicle is neither traveling in the vicinity of the parking lot nor is parked (NO in S102), controller 181 proceeds the processing to be performed to S111.

On the other hand, when controller 181 determines that the vehicle is traveling in the vicinity of the parking lot (YES in S101) or is parked (YES in S102), controller 181 controls vehicle-mounted camera 170 and reads image data of the surroundings (S103). Then, controller 181 analyzes whether a parking space is included in the read image data (S104). For example, controller 181 analyzes whether lines in white or another color (such as yellow) indicating parking spaces in the parking lot are drawn in the area thereof. It should be noted that various well-known techniques are applicable as an image data analysis technique.

Next, controller 181 determines whether or not there is a vacant parking space in the image data (S105). When controller 181 determines that there is no vacant parking space (NO in S105), controller 181 proceeds the processing to be performed to S111.

When controller 181 determines that the vehicle exits the parking space (YES in S100), controller 181 obtains the position where the vehicle has been parked from position detector 189, and specifies it as a vacant parking space (S106). In addition, when controller 181 determines that there is a vacant parking space (YES in S105), controller 181 specifies the position (location and longitude/latitude) of the vacant parking space from the image data (S106). Further, when the vehicle enters any of the vacant parking spaces, controller 181 does not specify the parking space as a vacant parking space.

Specifically, when controller 181 determines that there is a vacant parking space in the image data (YES in S105), controller 181 specifies a position moved from the position of vehicle 100, toward the center of the vacant parking space, by a distance between vehicle 100 and the vacant parking space, as the position of the vacant parking space. The direction of the center of the vacant parking space viewed from the position of vehicle 100 is specified from the direction of vehicle-mounted camera 170 which has shot the image data and the direction of the center of the parking space included in the image data. Further, the distance between vehicle 100 and the vacant parking space can be specified based on the image data shot with vehicle-mounted camera 170. For example, when vehicle 100 faces the north direction, the center of the parking space is in the middle of image data shot with vehicle-mounted camera 170 on the right (i.e., the east direction), and the distance between vehicle 100 and the center of the vacant parking space specified from the image data is five meters, a position moved five meters to the east from the position of vehicle 100 is specified as the position of the vacant parking space.

In addition, if information such as a two-dimensional code indicating the position of a parking space is drawn in the area within the parking space, the information is used. Specifically, when the two-dimensional code (identification information which can specify a position of each parking space) is displayed in each parking space included in the parking lot, the two-dimensional code included in the image data shot with vehicle-mounted camera 170 is decoded to specify coded data. When the specified data is the number of the parking space, or, in the case of a parking lot having a multi-floor structure, is the floor number of the parking space, information indicating the location of the parking lot where the parking space is located, longitude/latitude information of the parking space, or a combination thereof, the data is used as a portion of information specifying the position of the parking space. Further, when a number is drawn within the parking space, the number is considered as the number of the parking space, and the number is used as a portion of information specifying the position of the parking space.

Figure 6:
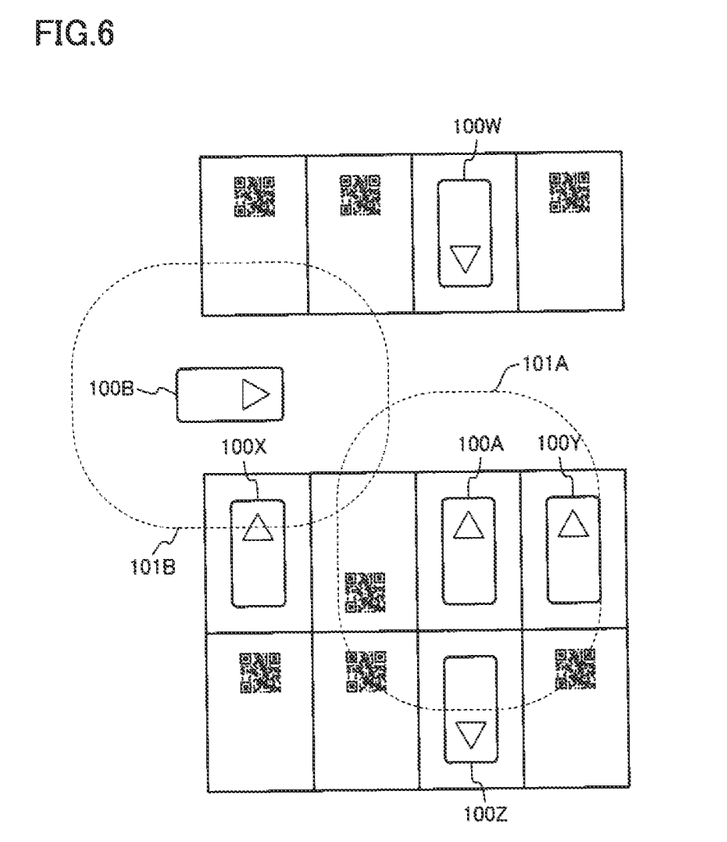
FIG. 6 is a view for illustrating an example of specifying vacant parking spaces in the present embodiment.

FIG. 6 is a view for illustrating an example of specifying vacant parking spaces in the present embodiment. Referring to FIG. 6, when vehicle 100A is parked, it is specified that five parking spaces to the left, rear left, rear, rear right, and right of the vehicle are included in a shooting range 101A with vehicle-mounted cameras 170, and, of these parking spaces, three parking spaces to the left, rear left, and rear right of the vehicle are specified as vacant parking spaces, because a vehicle 100Z is parked at the rear parking space and a vehicle 100Y is parked at the right parking space. In addition, when vehicle 100A exits its parking space, the parking space where the vehicle has been parked is specified as a vacant parking space.

Further, when a vehicle 100B is traveling in the vicinity of a parking lot, it is specified that four parking spaces to the left, front left, front right, and right of the vehicle are included in a shooting range 101B with vehicle-mounted cameras 170, and, of these parking spaces, three parking spaces to the left, front left, and front right of the vehicle are specified as vacant parking spaces, because a vehicle 100X is parked at the right parking space. In addition, when vehicle 100B enters a vacant parking space, the parking space is not specified as a vacant parking space. It should be noted that shooting range 101A, 101B may be any range in which a plurality of parking spaces around the vehicle can be shot, and may be a range wider than the range shown in FIG. 6.

Since the plurality of vehicles 100 check whether or not there is a vacant parking space therearound when they are traveling in the vicinity of the parking lot as indicated in S101, or when they are parked as indicated in S102 as described above, it is possible to determine that there is a vacant parking space. In addition, since the plurality of vehicles 100 always monitor whether or not there is a vacant parking space therearound as indicated in S105 when they are parked as indicated in S102, it is possible to immediately determine that there is a vacant parking space when another vehicle exits its parking space.

Turning back to FIG. 3, controller 181 controls communication device 130 to transmit information indicating the specified position of the vacant parking space (vacant parking space information) to server 200 (S107). If information is not drawn in the vacant parking space, controller 181 transmits information on the position of the vacant parking space including the location of the parking lot where the vacant parking space is located and the longitude and the latitude of the vacant parking space, specified from the position of the vehicle. If position-related information is drawn in the vacant parking space, controller 181 transmits information such as the location of the parking lot where the vacant parking space is located, the longitude and the latitude of the vacant parking space, the number of the vacant parking space, and a combination thereof specified from the drawn information, in addition to the information specified from the position of the vehicle.

Figure 4:
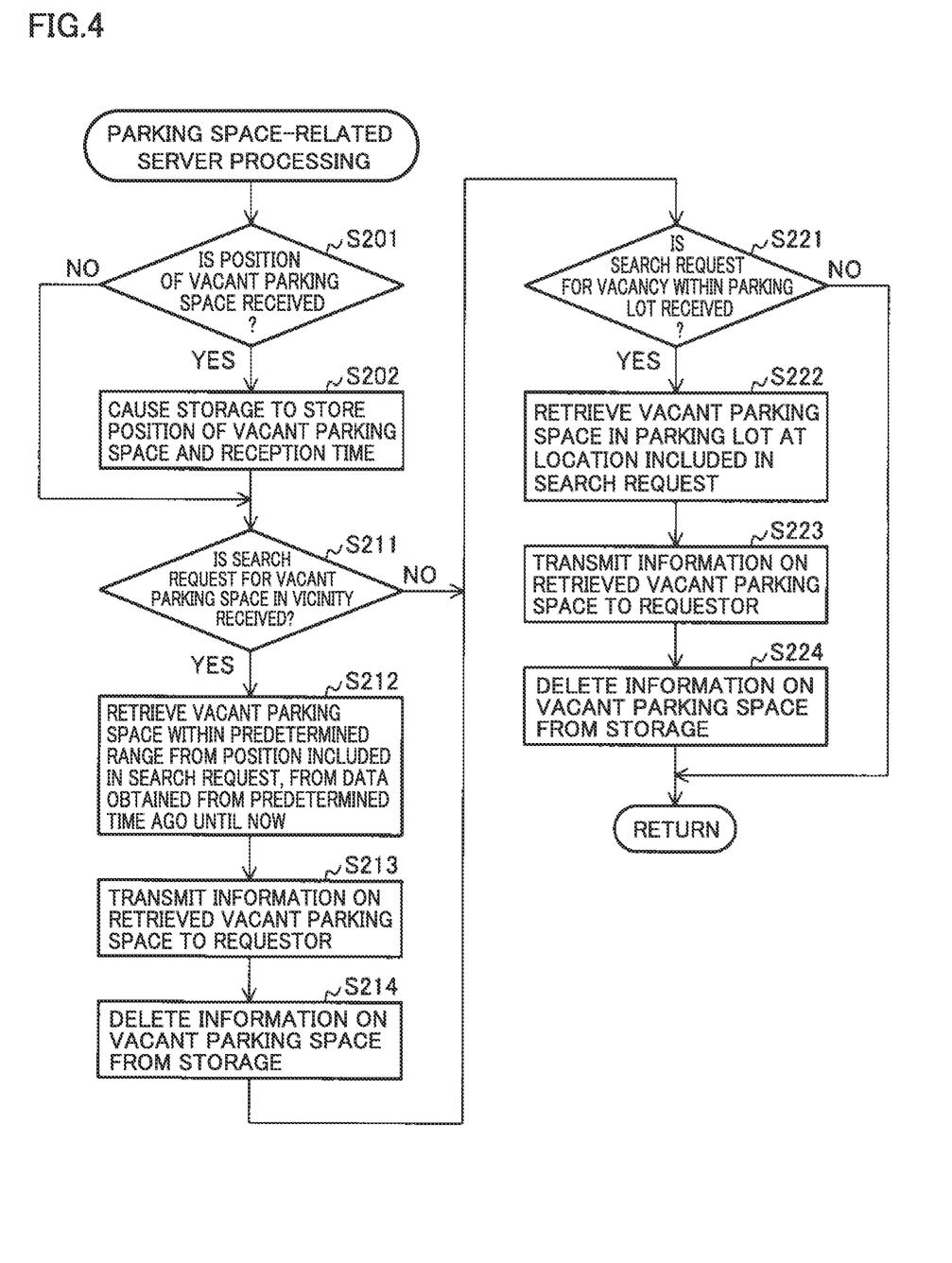
FIG. 4 is a flowchart showing a flow of parking space-related server processing performed by the server in the present embodiment.

FIG. 4 is a flowchart showing a flow of parking space-related server processing performed by server 200 in the present embodiment. Referring to FIG. 4, controller 210 of server 200 determines whether or not the information on the position of the vacant parking space is received from vehicle 100 (S201). When controller 210 determines that the information is not received (NO in S201), controller 210 proceeds the processing to be performed to S211.

On the other hand, when controller 210 determines that the information on the position of the vacant parking space is received (YES in S201), controller 210 causes storage 220 to store the received information on the position of the vacant parking space and a reception time in an associated manner (S202). Thereafter, controller 210 proceeds the processing to be performed to S211.

Figure 5:
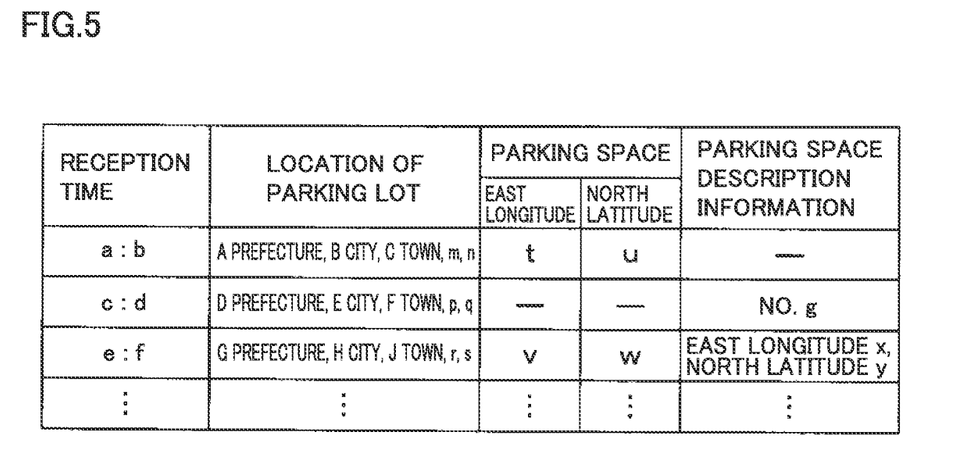
FIG. 5 is a view for illustrating parking space information stored in the server in the present embodiment.

FIG. 5 is a view for illustrating parking space information stored in server 200 in the present embodiment. Referring to FIG. 5, when the information on the position of the vacant parking space received at a reception time a:b includes "A prefecture, B city, C town, m, n" as the location of a parking lot, and "t" degrees and "u" degrees as the east longitude and the north latitude of the parking space, respectively, "a:b" as the reception time, "A prefecture, B city, C town, m, n" as the location of the parking lot, and "t" and "u" as the east longitude and the north latitude of the parking space are stored in storage 220 of server 200 in an associated manner. Similarly, when the received information on the position of the vacant parking space also includes parking space description information, information such as "No. g" which is the number of a parking space, or information such as "east longitude x, north latitude y" which are the longitude and the latitude of a parking space is stored.

Turning back to FIG. 3, controller 181 of navigation device 180 of vehicle 100 determines whether or not a request to search for the vacancy of a parking space in the vicinity is input by the operation of operation device 183 by a driver (S111). For example, controller 181 causes a menu screen to be displayed on a screen of informer 184, causes an option for searching for the vacancy of a parking space in the vicinity to be displayed as one of options on the menu screen, and determines whether or not this option is selected. When controller 181 determines that a request to search for the vacancy of a parking space in the vicinity is not input (NO in S111), controller 181 proceeds the processing to be performed to S121.

On the other hand, when controller 181 determines that a request to search for the vacancy of a parking space in the vicinity is input (YES in S111), controller 181 controls communication device 130 to transmit the current position (the longitude and the latitude) of vehicle 100, and a search request for a vacant parking space in the vicinity, to server 200 (S112).

Proceeding to FIG. 4, controller 210 of server 200 determines whether or not the search request for a vacant parking space in the vicinity is received from vehicle 100 (S211). When controller 210 determines that the search request is not received (NO in S211), controller 210 proceeds the processing to be performed to S221.

On the other hand, when controller 210 determines that the search request for a vacant parking space in the vicinity is received (YES in S211), controller 210 retrieves a vacant parking space within a predetermined range from the longitude and the latitude of vehicle 100 which has transmitted the search request, from data obtained from a predetermined time ago until now, of a database shown in FIG. 5 stored in storage 220 (the predetermined time may be an average vacant time of parking spaces in a parking lot in the vicinity of the position of the vehicle (for example, within the predetermined range), or may be a predefined time, for example) (S212). On this occasion, only vacant parking spaces in a parking lot having the best condition (for example, a parking lot which is nearest from the current position, or which is most inexpensive) may be retrieved, vacant parking spaces in several parking lots among parking lots having good conditions may be retrieved, or all vacant parking spaces in parking lots within the predetermined range may be retrieved.

Figure 7:
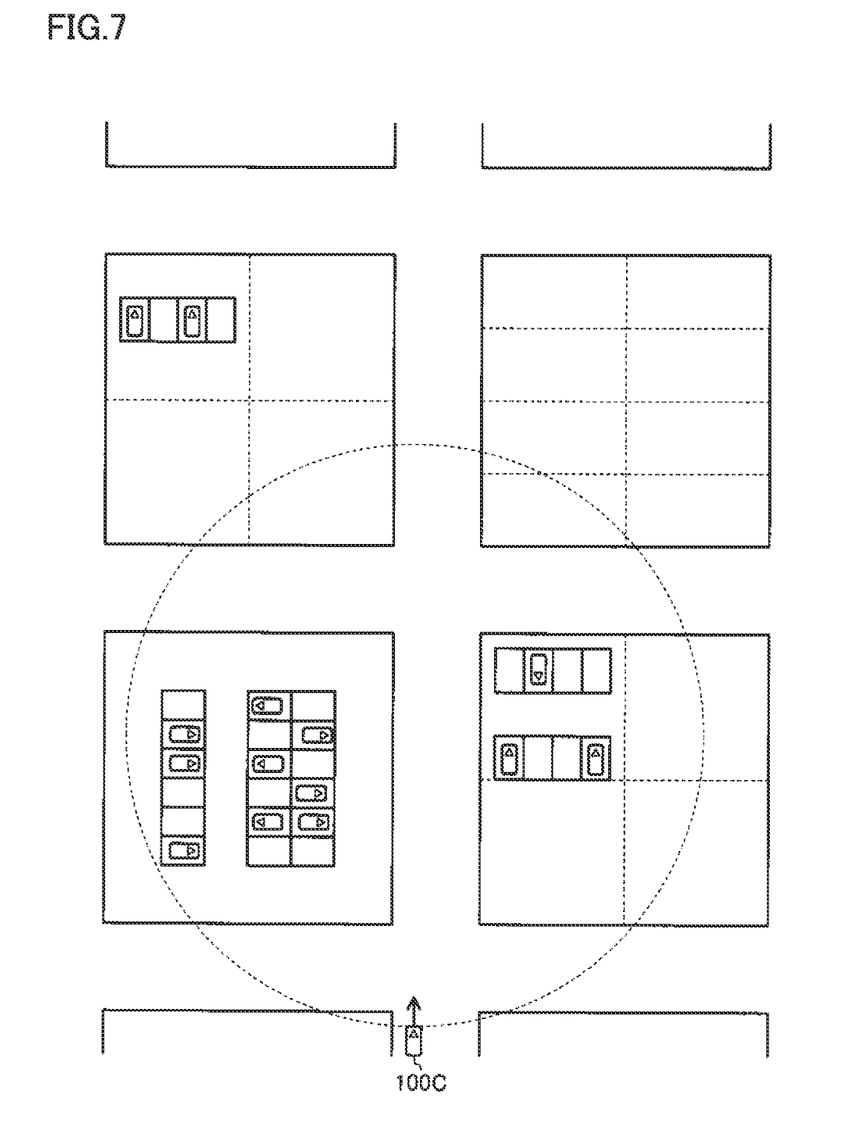
FIG. 7 is a view for illustrating a range for searching for vacant parking spaces in the present embodiment.

FIG. 7 is a view for illustrating a range for searching for vacant parking spaces in the present embodiment. Referring to FIG. 7, a predetermined range from the position of vehicle 100C is, for example, a range having a radius of h (m) centered at a point located h (m) ahead of the vehicle (for example, h=500). It should be noted that the predetermined range may be any other range in the vicinity of vehicle 100, and may be a range having a radius of j (km) (for example, j=1.0) from the position of the vehicle, or may be a range at which the vehicle arrives in k minutes (for example, k=5), for example.

In addition, an average vacant time of parking spaces in each parking lot is examined beforehand and stored in storage 220 in advance. Then, vacant parking spaces in a parking lot in which the time calculated by subtracting the time taken to arrive at the parking lot from the average vacant time of the parking lot is more than or equal to a predetermined time (for example, five minutes, zero minutes) may be provided as search results, from the data shown in FIG. 5 stored in storage 220.

Turning back to FIG. 4, controller 210 controls communication device 230 to transmit information indicating a position of the vacant parking space retrieved in S212 (target parking space information) to requesting vehicle 100 (S213). The transmitted information includes the location of the parking lot, the longitude and the latitude of the parking space, and the number of the parking space, for example. Then, controller 210 deletes the data of the vacant parking space transmitted to the requestor, from the database shown in FIG. 5 stored in storage 220 (S214).

Turning back to FIG. 3, controller 181 of navigation device 180 of vehicle 100 determines whether or not the information indicating the position of the vacant parking space in the vicinity (target parking space information) is received from server 200 (S113). When controller 181 determines that the information is not received (NO in S113), controller 181 repeats this processing.

When controller 181 determines that the information indicating the position of the vacant parking space in the vicinity (target parking space information) is received (YES in S113), controller 181 sets the position of the location of the parking lot or the longitude and the latitude of the parking space indicated by the information indicating the vacant parking space, as a destination for navigation, and starts navigation (S114). Thereafter, controller 181 proceeds the processing to be performed to S121.

Next, controller 181 determines whether or not a request to search for a vacant parking space within the parking lot where the vehicle is currently located is input by the operation of operation device 183 by the driver (S121). For example, controller 181 causes a menu screen to be displayed on the screen of informer 184, causes an option to search for a vacant parking space within the parking lot to be displayed as one of options on the menu screen, and determines whether or not this option is selected. When controller 181 determines that a request to search for a vacant parking space within the parking lot is not input (NO in S121), controller 181 returns the processing to be performed to a caller of this processing.

On the other hand, when controller 181 determines that a request to search for a vacant parking space within the parking lot is input (YES in S121), controller 181 controls communication device 130 to transmit the current position (location) of vehicle 100, and a search request for a vacant parking space within the parking lot including the location of the current position of vehicle 100, to server 200 (S122).

Proceeding to FIG. 4, controller 210 of server 200 determines whether or not the search request for a vacant parking space within the parking lot is received from vehicle 100 (S221). When controller 210 determines that the search request is not received (NO in S221), controller 210 returns the processing to be performed to a caller of this processing.

On the other hand, when controller 210 determines that the search request for a vacant parking space within the parking lot is received (YES in S221), controller 210 retrieves a vacant parking space within the parking lot where vehicle 100 is located, from data obtained from a predetermined time ago until now, of the database shown in FIG. 5 stored in storage 220 (the predetermined time may be an average vacant time of the parking spaces in the parking lot where vehicle 100 is located, or may be a predefined time, for example) (S222). On this occasion, only a vacant parking space having the best condition (for example, a vacant parking space nearest from the current position) may be retrieved, several vacant parking spaces having good conditions may be retrieved, or all vacant parking spaces within the parking lot may be retrieved.

Controller 210 controls communication device 230 to transmit information indicating the position of the vacant parking space retrieved in S222 (target parking space information) to requesting vehicle 100 (S223). The transmitted information includes the longitude and the latitude of the parking space, and the number of the parking space, for example. Then, controller 210 deletes the data of the vacant parking space transmitted to the requestor, from the database shown in FIG. 5 stored in storage 220 (S224).

Turning back to FIG. 3, controller 181 of navigation device 180 of vehicle 100 determines whether or not the information indicating the position of the vacant parking space within the parking lot (target parking space information) is received from server 200 (S123). When controller 181 determines that the information is not received (NO in S123), controller 181 repeats this processing.

When controller 181 determines that the information indicating the position of the vacant parking space within the parking lot (target parking space information) is received (YES in S123), controller 181 controls informer 184 to inform the position of the parking space indicated by the information indicating the vacant parking space (S124). Thereafter, controller 181 returns the processing to be performed to the caller of this processing.

For example, when the number of the vacant parking space is received, the number is informed. A layout drawing of the parking spaces in the parking lot is obtained if it can be obtained from server 200, or is read if it is stored in storage 182 in advance. Then, the layout drawing is displayed, and the parking space indicated by the number is displayed to be prominent (in red, for example).

When the position (the longitude and the latitude) of the vacant parking space is received, it is informed in which direction and how many meters away from the vehicle the vacant parking space is located, based on the difference from the current position (the longitude and the latitude) of the vehicle. A layout drawing of the parking spaces in the parking lot is obtained if it can be obtained from server 200, or is read if it is stored in storage 182 in advance. Then, the layout drawing is displayed, the parking space indicated by the longitude and the latitude of the vacant parking space is displayed to be prominent (in red, for example), and the number of the parking space is specified from the layout drawing and informed.

[Variations]

(1) The processing illustrated in FIG. 3 described above is performed by controller 181 of navigation device 180. However, the present disclosure is not limited thereto, and the processing may be performed by another device of vehicle 100, for example, controller 111 of control device 110. In this case, instead of operation device 183 and informer 184 of navigation device 180, vehicle 100 may include another operation device and another informer, and a request may be accepted by the other operation device and a search result may be informed by the other informer.

(2) In the processing illustrated in FIG. 3 described above, whether a parking space is included in the image of the surroundings is analyzed when either one of the conditions indicated in S101 and S102 is satisfied. However, the present disclosure is not limited thereto, and analysis may be performed when another condition is satisfied. The other condition may be, for example, a condition that a vehicle speed is less than or equal to a predetermined speed. In addition, whether a parking space is included in the image of the surroundings may be analyzed irrespective of whether a condition is satisfied.

(3) In the processing illustrated in FIG. 3 described above, the vehicles always monitor whether or not there is a vacant parking space therearound when they are parked, as indicated in S102 to S105. However, the present disclosure is not limited thereto, and the vehicles may monitor whether or not there is a vacant parking space therearound at a predetermined interval (for example, at an interval of five minutes, one hour, or an average vacant time of parking spaces for each parking lot) when they are parked.

(4) On a map displayed on informer 184 of navigation device 180, a region having many vacant parking spaces may be displayed to be distinguishable from a region having few vacant parking spaces. For example, the region having many vacant parking spaces may be displayed in blue, the region having few vacant parking spaces may be displayed in red, and an intermediate region may be displayed in yellow.

(5) In the embodiment described above, the information indicating the position of a vacant parking space (vacant parking space information) is transmitted from each vehicle 100 to server 200. However, the present disclosure is not limited thereto, and an image of the surroundings may be transmitted from each vehicle 100 to server 200, and server 200 may determine a vacant parking space.

(6) In the embodiment described above, the processing shown in FIGS. 3 and 4 is implemented when software is executed by the controllers. However, the present disclosure is not limited thereto, and the processing shown in FIGS. 3 and 4 may be partly or entirely implemented by a dedicated hardware circuit.

(7) In the embodiment described above, the disclosure has been described as parking space information providing system 10. However, the present disclosure is not limited thereto, and the disclosure can be considered as a method for providing parking space information performed by parking space information providing system 10. The disclosure can also be considered as a device such as vehicle 100 or server 200 included in parking space information providing system 10. Further, the disclosure can be considered as a method or a program performing the processing shown in FIG. 3 and the processing shown in FIG. 4 in vehicle 100 and server 200, respectively.

In addition, the disclosure can be considered as computer-readable recording medium 251 which records the program. This recording medium 251 may be a medium which stationarily carries a program, including a magnetic tape, a magnetic disk such as a flexible disk or a hard disk, an optical disk such as a CD-ROM, a CD-R, a CD-RW, a DVD-ROM, a DVD-R, a DVD-RW, a DVD-RAM, a DVD+R, or a DVD+RW, a magneto-optical disk such as an MO, a memory card, a USB memory, or the like, or may be a medium which fluidly carries a program such that the program is downloaded from a server such as an ASP (Application Service Provider) via the communication network.

(8) The techniques described in the embodiment and the variations are intended to be performed alone or in combination, as far as possible.

[Effects Obtained by Present Disclosure]

(1) As shown in FIGS. 1 and 2, parking space information providing system 10 in accordance with the present disclosure includes the plurality of vehicles 100, and server 200 configured to communicate with vehicles 100. As shown in FIG. 2, each of vehicles 100 includes vehicle-mounted camera 170 configured to shoot an image around the vehicle, position detector 189 configured to detect a position of the vehicle, informer 184 configured to inform a user of information, and controller 181. As shown in FIG. 2, server 200 includes controller 210.

As indicated in S100 to S107 of FIG. 3, controller 181 of first vehicle 100A, 100B specifies a position of an unoccupied parking space, from a position of the first vehicle detected by position detector 189 and the image shot with vehicle-mounted camera 170, and transmits vacant parking space information indicating the specified position to server 200. As indicated in S111, S112, S121, and S122 of FIG. 3, controller 181 of second vehicle 100C transmits a position of second vehicle 100C detected by position detector 189, and a request to obtain information indicating a position of an unoccupied parking space of parking spaces within a predetermined range from the position of second vehicle 100C, to server 200.

As indicated in S201 to S213 and S221 to S223 of FIG. 4, controller 210 of server 200 transmits target parking space information indicating a position of a parking space within the predetermined range from the position of second vehicle 100C which has transmitted the request, of the positions of the parking spaces indicated by the vacant parking space information transmitted from a plurality of first vehicles 100A and 100B, to second vehicle 100C. As indicated in S113 and S123 of FIG. 3, controller 181 of second vehicle 100C obtains the target parking space information transmitted from server 200. As indicated in S114 and S124 of FIG. 3, informer 184 of second vehicle 100C informs the position of the parking space indicated by the target parking space information obtained by controller 181.

Thereby, second vehicle 100C informs the position of the parking space within the predetermined range from the position of second vehicle 100C, of the unoccupied parking spaces indicated by the vacant parking space information from the plurality of vehicles 100A and 100B. As a result, it is possible to inform a driver of vehicle 100C of the unoccupied parking space without providing a special device to a parking lot.

(2) As indicated in S100, S106, and S107 of FIG. 3, controller 181 of first vehicle 100A, 100B specifies, when the first vehicle exits a parking space, a position of the parking space as the position of the unoccupied parking space, and transmits information indicating the position of the parking space (vacant parking space information) to server 200. Thereby, the position of the unoccupied parking space can be transmitted to server 200, other than based on the image shot with vehicle-mounted camera 170.

(3) As indicated in S102 to S107 of FIG. 3, controller 181 of first vehicle 100A, 100B specifies, when another vehicle exits a parking space, the a position of the parking space as the position of the unoccupied parking space, based on the image shot with vehicle-mounted camera 170, and transmits information indicating the position of the parking space (vacant parking space information) to server 200. Thereby, not only the position of a parking space which has been unoccupied before the shooting with vehicle-mounted camera 170, but also the position of a parking space which becomes unoccupied during the shooting with vehicle-mounted camera 170 can be transmitted to server 200.

(4) As shown in FIG. 6, in each parking space included in the parking lot, a two-dimensional code or a number (identification information) which can specify the position of the parking space is displayed. As indicated in S106 of FIG. 3, controller 181 of first vehicle 100A, 100B specifies the position of the parking space from the two-dimensional code or the number included in the image shot with vehicle-mounted camera 170. With such a configuration, vehicle 100A, 100B can specify the position of each parking space included in the parking lot from the two-dimensional code or the number.

(5) As indicated in S101 and S103 to S106 of FIG. 3, controller 181 of first vehicle 100A, 100B specifies the position of the unoccupied parking space, not only when the first vehicle is parked at a parking space but also when the first vehicle is traveling. This can increase opportunities to specify the position of an unoccupied parking space, and thus can specify more unoccupied parking spaces.

Although the embodiment of the present disclosure has been described, it should be understood that the embodiment disclosed herein is illustrative and non-restrictive in every respect. The scope of the present disclosure is defined by the scope of the claims, and is intended to include any modifications within the scope and meaning equivalent to the scope of the claims.

What is claimed is:

1. An information providing system comprising:
   a plurality of vehicles including a first vehicle and a second vehicle; and
   a server configured to communicate with each of the plurality of vehicles, each of the plurality of vehicles including
a camera configured to shoot an image around the vehicle,
a position detector configured to detect a position of the vehicle,
an informer configured to inform a user of information, and
a vehicle-side controller,
the server including a server-side controller,
the vehicle-side controller of the first vehicle being configured to
specify a position of an unoccupied parking space, from a position of the first vehicle detected by the position detector of the first vehicle and the image shot with the camera, and
transmit vacant parking space information indicating the specified position to the server,
the vehicle-side controller of the second vehicle being configured to transmit to the server, a position of the second vehicle detected by the position detector of the second vehicle, and a request to obtain information indicating a position of an unoccupied parking space of parking spaces within a predetermined range from the position of the second vehicle,
the server-side controller being configured to transmit target parking space information indicating the position of the unoccupied parking space of parking spaces within the predetermined range from the position of the second vehicle which has transmitted the request, of the specified position indicated by the vacant parking space information transmitted from the first vehicle, to the second vehicle,
the vehicle-side controller of the second vehicle being configured to obtain the target parking space information transmitted from the server,
the informer of the second vehicle being configured to inform the position of the unoccupied parking space of parking spaces within the predetermined range from the position of the second vehicle indicated by the target parking space information obtained by the vehicle-side controller of the second vehicle,
wherein the vehicle-side controller of the first vehicle is configured to specify the position of the unoccupied parking space, not only when the first vehicle is parked at a parking space but also when the first vehicle is traveling.

2. The information providing system according to claim 1, wherein the vehicle-side controller of the first vehicle is configured to specify, when the first vehicle exits a parking space, a position of the parking space as the position of the unoccupied parking space.

3. The information providing system according to claim 1, wherein the vehicle-side controller of the first vehicle is configured to specify, when another vehicle exits a parking space, a position of the parking space as the position of the unoccupied parking space, based on the image shot with the camera.

4. The information providing system according to claim 1, wherein
the information providing system comprises a parking lot including a plurality of parking spaces configured to display identification information which specifies a position of each parking space, and
the vehicle-side controller of each of the plurality of vehicles is configured to specify the position of the parking space included in the parking lot, from identification information included in the image shot with the camera.

5. A vehicle configured to communicate with a server comprising:
a camera configured to shoot an image around the vehicle;
a position detector configured to detect a position of the vehicle;
an informer configured to inform a user of information; and
a controller,
the controller being configured to
specify a position of an unoccupied parking space, from the position of the vehicle detected by the position detector and the image shot with the camera,
transmit vacant parking space information indicating the specified position to the server, to provide the vacant parking space information to another vehicle,
transmit to the server, the position of the vehicle detected by the position detector, and a request to obtain information indicating a position of an unoccupied parking space of parking spaces within a predetermined range from the position of the vehicle, and
obtain from the server, target parking space information indicating the position of the unoccupied parking space of parking spaces within the predetermined range from the position of the vehicle detected by the position detector,
the informer being configured to inform the position of the unoccupied parking space of parking spaces within the predetermined range from the position of the vehicle indicated by the target parking space information obtained by the controller,
wherein the controller is configured to specify the position of the unoccupied parking space, not only when the vehicle is parked at a parking space but also when the vehicle is traveling.

* * * * *